2,753,330
METHOD OF PRODUCING METAL RESINATES

John Drew and Ciro S. Lampo, De Ridder, La., assignors to Crosby Chemicals, Inc., De Ridder, La., a corporation of Mississippi No Drawing. Application March 24, 1953,
Serial No. 344,451

12 Claims. (Cl. 260—101)

Our invention relates to improvements in the method of producing metal resinates and has to do with the production of zinc resinates and zinc-calcium resinates having relatively great metal content and high melting point.

It is known in the art to produce zinc resinate by the reaction of rosin with zinc acetate or zinc oxide with or without the presence of acetic acid as a catalyst to speed up the reaction. It is also known to form zinc-calcium resinates by reacting the rosin with zinc oxide and calcium oxide in the presence of acetic acid. However, there is a practical limitation on the usefulness of these known methods in that their metal content, for example, the zinc content, may not exceed approximately 3.5% (4.5% zinc oxide equivalent based on the weight of rosin). If an attempt is made to react more than that amount of zinc oxide with molten rosin, the material sets into an infusible mass which cannot be melted below the decomposition point. If the reaction be carried out in a rosin solution, greater amounts of zinc oxide or zinc acetate can be reacted, but upon evaporation of the solvent the infusible residue appears. This phenomenon is known as "blocking" or "gelling" and the principal object of our invention is to provide a method for producing metal resinates of high metal content without "blocking" or "gelling."

It has been proposed heretofore to increase the metal content of the resinate, without "blocking" or "gelling," by causing the metal compound, such as zinc acetate or zinc oxide, to react with a rosin which has been given a preliminary treatment as by polymerization, heat treatment or dehydrogenation of disproportionation. Such preliminary treatments of the rosin, which have the effect of destroying or rearranging the conjugated systems of double bonds characteristic of rosin, are objectionable because they are expensive and require special equipment and apparatus not normally found in small operations. It is an object of our invention to provide a method of making metal resinates by reaction with rosin material, which is efficient and inexpensive and requires no preliminary treatment of the rosin to destroy or rearrange the conjugated system of double bonds.

It also has been proposed to produce metal resinates by reaction of a metal compound with the condensation products of rosin with an aldehyde but such metal resinates have relatively low melting points and dark colors for the metal content thereof, and are objectionable for that reason.

It is a prime object of our invention to provide an efficient and inexpensive process for making non-gelling metal resinates, having a metal content in excess of 3.5%, which are clear, brilliant, have relatively high softening points, give a viscous solution in hydrocarbon solvents, are free of uncombined metal, and have the property of imparting hardness and other desirable characteristics to varnish, enamels, inks and similar coatings.

It is known that the reaction of rosin with fumaric acid, maleic anhydride, aconitic anhydride or citric anhydride will produce, by what is known as the Diels-Alder reaction, a rosin adduct. This reaction is described, under the heading "Rosin-Maleic Anhydride Adduct," in "The Chemistry of Synthetic Resins" by Ellis at pages 856 and 857. Fumaric acid is not mentioned specifically in this publication, doubtless because it is an isomer of maleic acid and becomes maleic anhydride under certain temperature conditions. Similarly, citric acid becomes citric anhydride or aconitic acid under certain temperature conditions, and further splitting off of water results in aconitic anhydride.

We have discovered that the reaction of rosin with metal compounds to form non-gelling metal resinates is promoted by reacting the rosin by the Diels-Alder reaction to form a rosin adduct. The reaction to form the rosin adduct may precede, follow or be concurrent with the reaction by which the metal compound yields its metal to the rosin. The result of this procedure is that much greater quantities of the metal may be combined with the rosin without "gelling" or "blocking." The reactions may be carried out with molten rosin, in what may be called the fusion phase, or with solutions of rosin. In the latter case, the solvent is evaporated upon completion of the reaction without any "gelling" or "blocking." More specifically, we have found that non-gelling zinc resinate, or zinc-calcium resinate, having a metal content in excess of 3.5%, may be formed by subjecting the rosin material to rosin adduct-forming reactions and to reaction with zinc compounds, or zinc and calcium compounds.

The starting material may be wood rosin, gum rosin, a pine oleoresin, tall oil, or a rosin derivative containing a conjugated system of double bonds, all of which we comprehend within the term "rosin material." To form the rosin adduct, the rosin material may be reacted with citric acid, which may become aconitic anhydride or citric anhydride at the temperature of reaction, or fumaric acid or maleic anhydride. We prefer to use fumaric acid, which may become maleic anhydride at the reaction temperature and when we refer in the claims to "the rosin-maleic anhydride adduct" we intend to include the adduct formed by fumaric acid. The products formed are not limited to basic or neutral metal resinates but include those that are slightly acid.

The following examples illustrate variations of our process for producing zinc and zinc-calcium resinates that are clear, brilliant, non-gelling and have a relatively high melting point.

EXAMPLE 1

Three hundred and twenty grams of wood rosin, of WW grade, were melted and thirty grams of fumaric acid added thereto. This mixture was stirred mechanically and its temperature was raised to 200° C. and held there for one hour. The temperature was increased to from 235° to 240° C. and 81 grams of zinc acetate were added in small portions, allowing each portion to react before further addition. After the addition of zinc acetate was completed, the temperature was allowed to rise to 250° C. and held there for twenty minutes. During the last five minutes the material was sparged slightly with carbon dioxide to remove any water of reaction. No blocking or gelling occurred and the product was repeatedly melted and cooled without any blocking or gelling. The product was a clear, brilliant, non-gelling zinc resinate of color grade H, having a melting point by the A. S. T. M. ring and ball method of 134.2° C., a free acid number of 52.2 and a zinc content of 6.6% (8.2% zinc oxide equivalent). The temperatures given above are typical for use in the laboratory, but are not critical. The temperature is regulated to give a fluid condition so that the reaction may proceed but must not exceed the temperature at which decomposition of the resinate takes place. The range of temperatures that may be employed usefully is from the melting point of the resinate to the temperature at which it decomposes.

EXAMPLE 2

Three hundred grams of wood rosin, color grade WW, were melted and the temperature raised to 230° C. Zinc acetate was added slowly and, when 13.5 grams had been added, the reaction mixture set into a semi-solid mass or gel. Six grams of fumaric acid were added to the mixture and the gel broke immediately and the product was a clear and brilliant non-gelling zinc resinate. The temperature of 230° C. is typical but not critical. This temperature may be between the melting point of the resinate and the temperature at which it decomposes.

EXAMPLE 3

Three hundred grams of wood rosin, color grade WW, were melted and the temperature raised to 230° C. A powdered mixture of fifteen grams fumaric acid and 50 grams zinc acetate, was slowly added to the molten rosin in small portions, allowing each portion to react before further addition, and the temperature maintained at from about 230° to 250° C. during the additions. After the additions were completed the temperature was maintained at 250° C. for several hours. No gelling or blocking occurred at any time and the product was a clear, brilliant, non-gelling zinc resinate containing in excess of 3.5% zinc. The temperatures given above are typical but not critical. They may range between the melting point of the resinate and its temperature of decomposition.

EXAMPLE 4

To demonstrate the value of the fumaric acid in the prevention of gelling, a series of tests with zinc acetate and another series with zinc oxide were run, in which various percentages of fumaric acid were employed and the zinc compound added until the occurrence of gelling.

In one series of tests, three hundred grams of wood rosin, color grade WW, were melted and the quantity of fumaric acid was added as indicated, in percentage by weight of the rosin, in the following tabulation. The temperature was allowed to rise to 200° C. and held there for thirty minutes. Zinc acetate was then added, in small portions, at a temperature of about 235° to 245° C., each portion being allowed to react before the next portion was added. The addition of zinc acetate was continued until gelling or blocking took place. In the following tabulation, for each percentage of fumaric acid, there is indicated the percentage of zinc acetate, based on the weight of the rosin, which had been added when gelling occurred, except that, in the case of 10% fumaric acid, the addition of zinc acetate was discontinued at the percentage stated and no gelling or blocking occurred.

*Quantity of zinc acetate added before occurrence of gelling*

| Percent Fumaric Acid | Percent Zinc Acetate |
|---|---|
| 0 | 5.0 |
| 1 | 9.33 |
| 3 | 16.33 |
| 5 | 25.27 |
| 10 | 53.33 |

In the other series of tests, three hundred grams of wood rosin, color grade WW, were melted and the quantity of fumaric acid was added, as indicated by the following tabulation, in percentage by weight of the rosin. The temperature was allowed to rise to 200° C. and held there for thirty minutes. Five grams of acetic acid were then added, as a catalyst, and then zinc oxide was added, at a temperature of about 235° to 245° C., in small portions, each portion being allowed to react before the addition of the next portion. The addition of zinc oxide was continued until gelling or blocking took place. In the following tabulation, for each percentage of fumaric acid there is indicated the percentage of zinc oxide, based on the weight of the rosin, which had been added when gelling occurred, except that, in the case of 10% fumaric acid, the addition of zinc oxide was discontinued at the percentage stated and no gelling or blocking occurred.

*Quantity of zinc oxide added before occurrence of gelling*

| Percent Fumaric Acid | Percent Zinc Oxide |
|---|---|
| 0 | 4.33 |
| 1 | 5.33 |
| 3 | 5.67 |
| 5 | 9.67 |
| 10 | 20.00 |

These tests show that the use of as little as 1% fumaric acid increases substantially the percentage of zinc compound that may be reacted without gelling and that, if 10% fumaric acid is employed, very large percentages of zinc compound may be reacted without gelling. In the practical use of our process, the amount of fumaric acid used will probably be between 1% and 10% of the weight of the rosin.

EXAMPLE 5

Three hundred and twenty grams of wood rosin, color grade WW, were melted and thirty grams of maleic anhydride added thereto. The temperature was raised to 200° C. and held there for thirty minutes. The temperature was then raised to 235° to 250° C. and eighty-one grams of zinc acetate were added in small portions, allowing each portion to react before the addition of the next. After the addition of zinc acetate was completed, the temperature was held at 250° C. for thirty minutes. No gelling or blocking occurred during the reaction and the product was dissolved in mineral spirits without gelling or blocking. The product was a clear, brilliant, non-gelling zinc resinate containing 6.66% zinc (8.30% zinc oxide equivalent). It had a melting point of 125° C. by the A. S. T. M. ring and ball method and a free acid number of 19.5. A 60% solution of the product in mineral spirits had a viscosity of W-X on the Gardner scale, and it required 1.25 hours to dissolve this product.

EXAMPLE 6

Three hundred grams of wood rosin, color grade WW, were melted and thirty grams citric acid (anhydrous) were added thereto. The citric acid was allowed to react with the rosin, at a temperature of from 200° to 250° C., until such time as an abietic acid determination showed that substantially all the citric acid (or its anhydride) had formed an adduct with the rosin. Fifty grams of zinc acetate were added, at a temperature of from 230° to 240° C., in small portions, allowing each portion to react before further addition. After the addition of zinc acetate was completed, the temperature was allowed to rise to 250° C. and held there for about thirty minutes. No gelling or blocking occurred at any time. The product was a clear, brilliant, non-gelling zinc resinate containing 4.82% zinc (6.0% zinc oxide equivalent) having a melting point of 99° by the A. S. T. M. ring and ball method and a free acid number of 75.6.

EXAMPLE 7

One thousand grams of wood rosin, color grade WW, were melted and twenty grams of maleic anhydride were added thereto. The temperature was then raised to 200° C. and held there for thirty minutes. The temperature was then increased to 230° C. and 10 ml. of acetic acid were added. A mineral spirits slurry containing thirty grams of hydrated lime, in the approximate ratio of one part lime to five parts mineral spirits, was then added in small portions, allowing each portion to react, over a period of about one hour. With the temperature maintained at 230° to 240° C., thirty-five grams of zinc oxide in a mineral spirits slurry were added in small portions, in the same manner as in the addition of the lime. After all the zinc oxide had reacted, thirty grams of lime in a mineral spirits slurry were added in small portions. The mixture was allowed to react for thirty minutes and was then diluted with mineral spirits to approximately a 50% solution, which solution was then filtered. The solvent was removed by steaming with live steam and externally applied heat up to a temperature of 260° C. No gelling or blocking occurred at any time during the reaction or subsequent steaming. The product was a clear, brilliant, non-gelling zinc-calcium resinate containing 2.80% zinc (3.50% zinc oxide equivalent) and 2.82% calcium (5.3% calcium hydroxide equivalent) or a combined metal content of 5.62%. The product had a melting point of 177° C. by the A. S. T. M. ring and ball method and a free acid number of 25.5. A 60% solution of this product in mineral spirits had a viscosity of Z on the Gardner scale. The temperatures given above are typical but not critical. They may range between the melting point of the resinate and its temperature of decomposition.

EXAMPLE 8

Three hundred grams of gum rosin, color grade WW, were melted and fifteen grams of maleic anhydride were added thereto. The temperature was raised to 200° C. and held there for thirty minutes. The temperature was then increased to 230° to 240° C. and fifty grams of zinc acetate were added in small portions, each portion being allowed to react before further addition. After the addition of zinc acetate was completed, the temperature was allowed to rise to 250° C. and maintained there for thirty minutes. No gelling or blocking occurred at any time during this procedure. The product was a clear, brilliant, non-gelling zinc resinate containing 5.01% zinc (6.2% zinc oxide equivalent), having a melting point of 121.5° C. by the A. S. T. M. ring and ball method and having a free acid number of 74.3.

EXAMPLE 9

Three hundred grams of M grade sulphate wood rosin (tall oil rosin) were melted and fifteen grams of maleic anhydride added thereto. The temperature was raised to 200° C. and held there for thirty minutes. The temperature was then increased to 230° to 240° C. and fifty grams of zinc acetate were added in small portions, each portion being allowed to react before further addition. After all the zinc acetate had been added, the temperature was raised to 250° C. and held there for twenty-five minutes. No gelling or blocking occurred at any time during the procedure. The product was a clear, non-gelling zinc resinate having a melting point of 104° C. by the A. S. T. M. ring and ball method.

We are aware that the novel method of producing metal resinates herein disclosed is susceptible of considerable variation without departing from the spirit of our invention and, therefore, we claim our invention broadly as indicated by the appended claims.

Having thus described our invention, what we claim as new and useful, and desire to secure by Letters Patent, is:

1. The improvement in the fusion process of making a non-gelling, high melting point, metal resinate from rosin, having a metal content in excess of 3.5% of the weight of rosin, including the steps of reacting rosin material with a compound of the type capable of forming a rosin adduct by the Diels-Alder reaction and directly reacting said rosin adduct in a molten state with a reactive compound of a metal of the group consisting of zinc and calcium, capable of yielding its metal to the rosin.

2. The process of claim 1 in which the rosin-adduct-forming compound is reacted in the proportion by weight of from 1% to 10% of the rosin material.

3. The process of claim 2 in which the rosin-adduct-forming compound is one of the group consisting of fumaric acid and maleic anhydride.

4. The process of claim 3 in which the metal is zinc.

5. The direct process of making a non-gelling zinc resinate of high melting point and containing more than 3.5% zinc comprising the steps of mixing fumaric acid and molten rosin, heating the mixture to a temperature above the melting point of the resinate and below the temperature at which it decomposes, adding zinc acetate to the mixture, and again heating to a temperature within said range.

6. The process of claim 5 in which the mixture is heated to about 200° C. for about one hour, and the final heating is to a temperature in the range of about 235° C. to 250° C.

7. The direct process of making a non-gelling zinc resinate of high melting point, and containing zinc in excess of 3.5%, comprising the steps of heating molten rosin to a temperature between the melting point of the resinate and the temperature at which it decomposes, mixing zinc acetate with the heated rosin, and adding fumaric acid to the heated mixture.

8. The process of claim 7 in which the molten rosin is heated to about 230° C.

9. The direct process of making a non-gelling zinc resinate of high melting point, and containing more than 3.5% of zinc, comprising the steps of melting rosin, heating the molten rosin to a temperature between the melting point of the resinate and the temperature at which it decomposes, adding to the molten rosin a mixture of fumaric acid and zinc acetate while maintaining the rosin at a temperature within said range, and continuing to maintain the temperature for a period after the addition is completed.

10. The process of claim 9 in which the molten rosin is heated to about 230° C. and maintained at a temperature of from about 230° C. to about 250° C.

11. The direct process of making a non-gelling zinc-calcium resinate of high melting point, and having a zinc-calcium content in excess of 3.5%, comprising the steps of adding maleic anhydride to molten rosin, heating the molten rosin to a temperature between the melting point of the resinate and the temperature at which it decomposes, adding acetic acid thereto, adding to the mixture a slurry of hydrated lime in mineral spirits, adding a slurry of zinc oxide in mineral spirits, and then adding additional portions of the lime slurry.

12. The process of claim 11 in which the molten rosin is heated to about 230° C.

References Cited in the file of this patent

UNITED STATES PATENTS

| | | |
|---|---|---|
| 2,251,806 | Rust et al. | Aug. 5, 1941 |
| 2,350,521 | O'Neal | June 6, 1944 |
| 2,350,526 | O'Neal | June 6, 1944 |
| 2,383,933 | Bump | Sept. 14, 1945 |